Jan. 21, 1930.  L. COURTOT  1,744,039
COMBINED BOILER AND KITCHEN RANGE
Filed Aug. 22, 1923    2 Sheets-Sheet 1
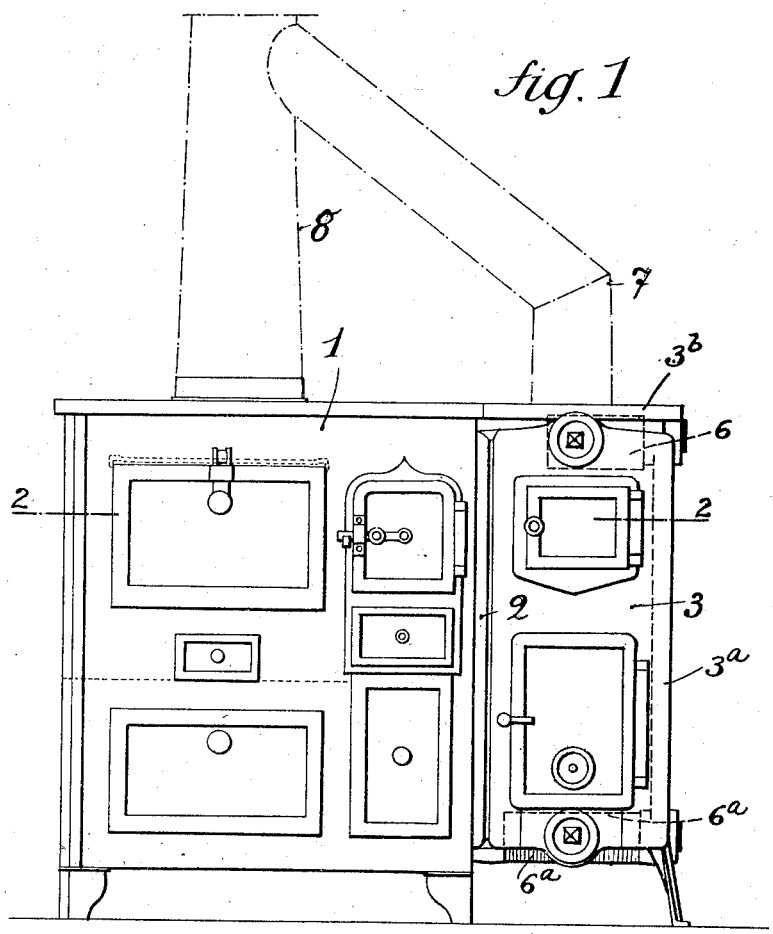
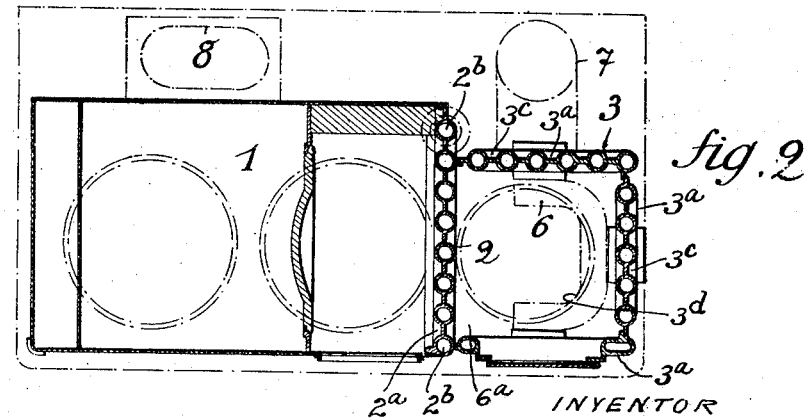

Jan. 21, 1930. L. COURTOT 1,744,039
COMBINED BOILER AND KITCHEN RANGE
Filed Aug. 22, 1923 2 Sheets-Sheet 2

INVENTOR
Louis Courtot
BY
Conrad A. Dieterich
his ATTORNEY

Patented Jan. 21, 1930

1,744,039

UNITED STATES PATENT OFFICE

LOUIS COURTOT, OF PARIS, FRANCE, ASSIGNOR TO AMERICAN RADIATOR COMPANY, OF NEW YORK, N. Y., A CORPORATION OF NEW JERSEY

COMBINED BOILER AND KITCHEN RANGE

Application filed August 22, 1923, Serial No. 658,738 and in France August 23, 1922.

My invention relates to improvements in heating apparatus, and the same has for its object to provide at all times a constant supply of hot water for domestic use, such as for bath and toilet purposes, and particularly during the warmer seasons when the house heating boiler is not in use.

To the attainment of the foregoing objects the heating of the water is accomplished by the use of two heating apparatus, viz, a hot-water-heating boiler and a kitchen stove.

The apparatus constructed according to my invention comprises a kitchen range of known type in which one side is removed and replaced by a fluid containing element in the form of a tubular panel, with which are operatively associated three similar panels arranged in the form of a rectangle. The said panels constitute a heating apparatus for the supply of hot water. The fluid containing element constituting the wall common to the fuel receptacles of both heating apparatus will absorb heat generated in both of said apparatus. In the winter time the boiler and the kitchen range, jointly, may supply the heat to the intermediate water containing wall element, and in the summer time the kitchen range only may be used to supply heat to said element to insure the proper supply of hot water at all times.

In the accompanying drawings showing one illustrative embodiment of my invention,—

Figure 1 is a front elevation;

Fig. 2 is a horizontal section on the line 2—2 of Figure 1, and

Figure 3:
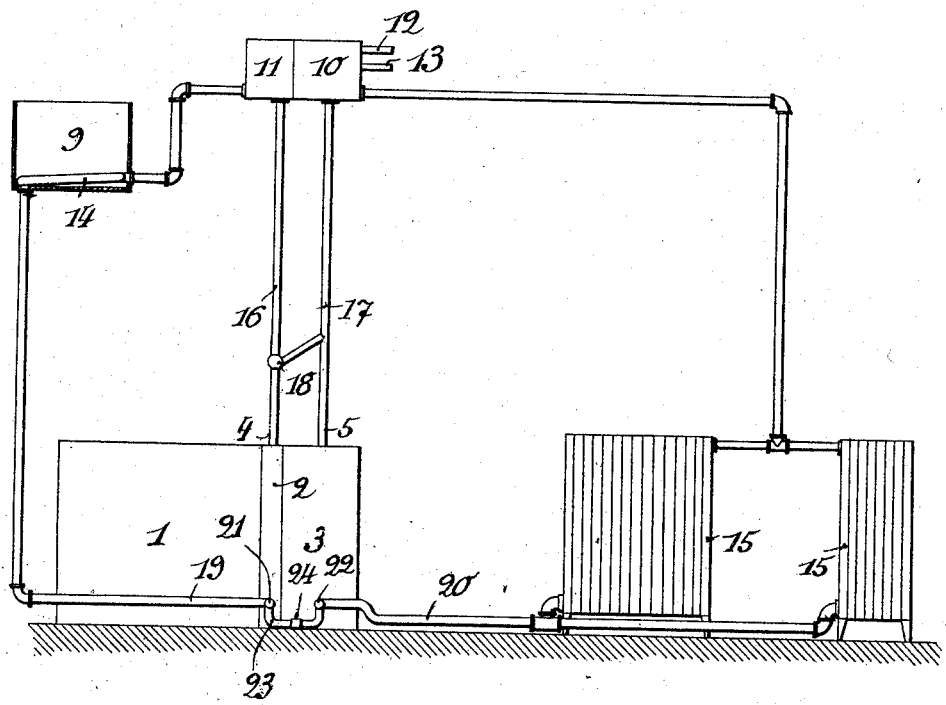
Fig. 3 is a diagrammatic view illustrating the installation.

In said drawings, the apparatus is shown comprising a heating member such as a kitchen range 1 of known general form having one side thereof formed by a fluid containing element or panel 2, which may consist, for example, of a hollow cast iron panel 2 provided with horizontal headers $2^a$ at the top and bottom thereof, and a series of vertical conduits or tubes $2^b$ communicating at their opposite ends with said headers, and forming a secondary boiler. The said panels are preferably of the form shown in my prior patent dated February 22, 1916, No. 1,172,768, but the same may be made in any desired or convenient form. To the intermediate panel 2 are secured three similar panels $3^a$ forming therewith the rectangular fuel receptacle of the main boiler.

The three boiler panels $3^a$ only are communicatively connected at their top and bottom headers $3^c$ by collecting chambers 6, $6^a$ and form a main boiler, the panel 2 not being in direct communication with said collecting chambers 6, $6^a$. The upper collecting chamber 6 has an open central part so that the cover plate $3^b$ located upon the boiler above the collecting chamber 6 will be directly exposed to the heat radiated by the incandescent fuel and hot gases within the boiler. The cover plate $3^b$ is provided with an opening adapted to be closed by a cover $3^d$ to permit of the top of the boiler being used for cooking purposes when the kitchen range is not fired.

The lower collecting chamber $6^a$ may be disposed on a level with the lower part of the ash-pit, as illustrated, or on a level with the grate. In the latter position the collecting chamber is preferably constructed of annular or semi-annular form similiar to the upper collecting chamber 6.

The smoke pipe 7 of the boiler is disposed at the rear thereof, and is connected to the smoke pipe 8 extending from the range 1.

As illustrated diagrammatically at Fig. 3, the heating apparatus includes a fluid circulating liquid heating system including the heat absorbing element 2 for circulating the fluid heated therein to and from a container or reservoir 9 for heating the contents thereof. For this purpose the element 2 has an outlet 4 at the upper portion thereof receiving a flow pipe 16 having interposed therein an expansion chamber 11 and heat emitting means, such as the worm tube 14 within the reservoir 9 for heating the contents of the reservoir. The circulating fluid passing through the pipe 16 and worm 14 is returned through the pipe 19 communicating with the element 2 at the lower portion thereof at the point 21.

The fluid circulating heating system includes the boiler 3 and the radiators 15.

Heating fluid is supplied to the radiators 15 through the flow pipe 17 communicating with the upper portion of the boiler through the outlet 5 having an expansion chamber 10 interposed therein. The return from the radiators 15 is through the pipe 20 connected with the lower portion of the boiler 3 at 22.

The expansion chambers 10 and 11 are arranged in juxtaposition and may consist of separate receptacles or of a single receptacle having an intermediate partition. The overflow pipe 12 and the feed pipe 13 associated with the chamber 10 suffice for both chambers 10 and 11 because the circulating systems including the same are in intercommunication as hereinafter described. The chamber 9 is provided with the usual cold water inlet and hot water outlet, and may be open to the atmosphere or may be subjected to the pressure of the water supply system.

When the kitchen range and the boiler are operated at the same time, the panel 2 is heated on both sides, and in this event it may happen that the said panel will supply more hot water than is needed. Even should the panel 2 be heated only on one side, in certain cases the heating of the water may be above that which is required. In order, therefore, to obviate a waste of hot water, or the boiling of the water in the chamber 9, the hot water outlet pipe 16 of the panel 2 is provided with a by-pass 18 so that the whole or part of the hot water from said panel 2 can be discharged into the hot water outlet pipe 17 of the boiler 3, and thus serve to heat the radiators 15.

The by-pass 18 is so arranged that the stream of hot water from the panel shall flow through either the pipes 16 or 17, or both, but without interruption in any case.

In order to enable the water to return to the orifice 21 of the panel 2, said orifice is connected with the return orifice 22 of the boiler 3 by a communicating pipe 23; the latter extends downwardly from the orifice 21, so that when the panel 2 is in use and the boiler 3 is inoperative, the return water of the panel will not, at the same time, pass into the boiler and unnecessarily heat the water therein.

To more positively obviate this disadvantage, one may, if necessary, interpose in the connecting pipe 23 a check valve 24, preferably a swinging valve, which will prevent the water from passing from the pipe 21 to the pipe 22 but will allow it to proceed from the pipe 22 to the pipe 21.

In some exceptional cases in which there will be no inconvenience in allowing the return water of the panel 2 to circulate at the same time through the boiler, use may be made of a single return orifice common to the panel 2 and the boiler 3, the panel being directly connected by a union with the lower collector of the boiler. But in all cases, the hot water outlet orifice 4 of the panel 2, and the outlet 5 of the boiler 3 are independent.

Suitable valves may be placed at any points in the various piping of the installation to control the passage of water.

I claim:

1. A heating apparatus of the character described comprising a heating member, a separately heated boiler, a fluid containing element disposed to absorb heat generated in said member and said boiler, a fluid circulating liquid heating system including said element, a fluid circulating heating system including said boiler, and a by-pass connection between said systems, substantially as specified.

2. A heating apparatus of the character described comprising a heating member having a fuel receptacle, a boiler having a fuel receptacle, a fluid containing element constituting a wall common to said fuel receptacles, a fluid circulating system including said boiler, a fluid circulating system including said element, and a by-pass connection between said systems, substantially as specified.

3. A heating apparatus of the character described comprising a heating member, a separately heated boiler, a fluid containing element disposed to absorb heat generated in said member and said boiler, a fluid circulating heating system including said boiler, a liquid container, a fluid circulating system including an element for heating the liquid in said container, a by-pass connection between the flow portions of said systems, and a connection between the return portions of said systems, substantially as specified.

4. A heating apparatus of the character described comprising a heating member, a separately heated boiler, a fluid containing element disposed to absorb heat generated in said member and said boiler, flow pipes extending from said boiler and said element, a by-pass connection between said flow pipes, and means for controlling the flow of fluid from said element through said pipes, substantially as specified.

5. A heating apparatus of the character described comprising a heating member having a fuel receptacle, a boiler having a fuel receptacle, a fluid containing element constituting the common wall between said fuel receptacles, a liquid container, a fluid circulating system including an element for heating the liquid in said container, a fluid circulating heating system including said boiler, separate expansion chambers disposed in said systems, a by-pass connection between the flow portions of said systems, and a connection between the return portions of said systems to permit of the flow of fluid in one direction from the boiler return to said element, substantially as specified.

6. A heating apparatus of the character described comprising a heating member, a separately heated boiler, a fluid containing wall element disposed between said heating member and said boiler to absorb heat generated in said member and in said boiler, separate flow and return pipes extending from said boiler and said element, and constituting separate fluid circulating systems, a liquid container associated with one of said systems, heat emitting means associated with the other of said systems, and a by-pass connection between said flow pipes, substantially as specified.

7. An apparatus of the character described comprising a heating apparatus composed of two parts, a fuel receptacle for each of said parts; one of said parts serving as a boiler and having hollow water containing wall portions, a hollow water-containing wall interposed between said fuel receptacles and separating the same, and independent flow and return connections for said boiler and for said intermediate wall, substantially as specified.

8. An apparatus of the character described comprising a heating apparatus composed of two parts, a separate fuel receptacle for each of said parts; one of said parts serving as a main boiler and having hollow outer wall portions, a hollow inner wall portion constituting a separate water heating element, and serving to separate said two fuel receptacles, and means for conducting the heated water separately from the outer wall portions of said boiler, and from said inner wall portion to and from receptacles for receiving the heated water, substantially as specified.

9. An apparatus of the character described comprising a heating apparatus composed of two parts, a separate fuel receptacle for each of said parts; one of said parts serving as a main boiler having hollow outer wall portions, a hollow inner wall constituting a separate, secondary water heating element and serving to separate said two fuel receptacles, separate flow and return pipes leading from said main boiler and from said secondary heating element to and from receptacles for receiving the heated water, and valve means in the return pipe leading to said secondary water heating element whereby to prevent the return water to said secondary water heating element entering said main boiler, substantially as specified.

In testimony that I claim the foregoing as my invention I have signed my name.

LOUIS COURTOT.